United States Patent [19]

Hough

[11] Patent Number: 5,486,014
[45] Date of Patent: Jan. 23, 1996

[54] DOLLY HAVING ELONGATED CHANNEL WITH RELEASABLE FRICTIONAL SECUREMENT DEVICE

[76] Inventor: Darald F. Hough, 128 S. Sante Fe, Salina, Kans. 67401

[21] Appl. No.: 207,928

[22] Filed: Mar. 8, 1994

[51] Int. Cl.⁶ .................................................. B62B 3/04
[52] U.S. Cl. ........................... 280/79.11; 24/535; 269/17; 269/239; 269/246
[58] Field of Search .................... 280/292, 35, 43.12, 280/87.01, 79.11, 79.7, 47.131; 269/17, 239, 246, 278, 254 R; 24/535, 569

[56] References Cited

U.S. PATENT DOCUMENTS

| | | | |
|---|---|---|---|
| 605,162 | 6/1898 | Deane | 280/47.131 |
| 1,194,943 | 9/1916 | Broling | 24/535 X |
| 1,604,723 | 10/1926 | Rutherford | 280/47.131 |
| 2,305,284 | 12/1942 | Trabant | 280/47.131 |
| 2,457,811 | 1/1949 | Emrich | 269/239 X |
| 3,105,698 | 10/1963 | Bonarrigo et al. | 280/47.13 |
| 3,167,292 | 1/1965 | Meyerowitz | 24/535 X |
| 3,288,483 | 11/1966 | Pittenger | 280/79.1 |
| 3,477,686 | 11/1969 | Engelsher et al. | 24/535 X |
| 3,533,640 | 10/1970 | Fator | 280/35 |
| 3,580,601 | 5/1971 | Miles | 280/47.13 |
| 3,861,662 | 1/1975 | Morse | 269/17 |
| 4,054,279 | 10/1977 | Wain | 269/239 X |
| 4,178,006 | 12/1979 | Johnson | 280/79.1 A |
| 4,195,895 | 4/1980 | Ziegler | 269/246 X |
| 4,220,347 | 9/1980 | Hutington | 280/79.1 A |
| 4,270,741 | 6/1981 | Hurst | 269/17 |
| 4,699,391 | 10/1987 | Syring | 280/79.1 A |
| 4,978,132 | 12/1990 | Wilson et al. | 280/47.131 |

OTHER PUBLICATIONS

Paul L. Jansen & Son Catalog—2 pages.

*Primary Examiner*—Margaret A. Focarino
*Assistant Examiner*—Michael Mar
*Attorney, Agent, or Firm*—John R. Flanagan

[57] ABSTRACT

A dolly includes an elongated rigid support member for receiving a lower end portion of a panel-shaped support leg of an upright piano. The support member is formed by an elongated bottom wall and a pair of side walls rigidly connected along opposite longitudinal side edges of the bottom wall and extending upwardly therefrom so as to define an elongated channel extending between the spaced side walls and above the bottom wall of the support member. The channel is open along its upper end to receive the lower end portion of the support leg of the upright piano. The dolly also includes a pair of carriages supporting the opposite ends of the support member. The dolly further includes a releasable frictional securement device mounted to one of the side walls of the support member and having a semi-flexible flat band disposed along the interior of a portion of the one side wall of the support member and attached thereto at one end of the band, and a thumb screw having a stem threadably mounted through a threaded aperture in the one side wall for engaging an opposite end of the band at an inner end of threaded stem. The thumb screw also has a finger grip head attached to an outer end of the threaded stem for turning the stem to force the band into frictional contact with a surface of the support leg and secure the dolly thereto.

4 Claims, 1 Drawing Sheet

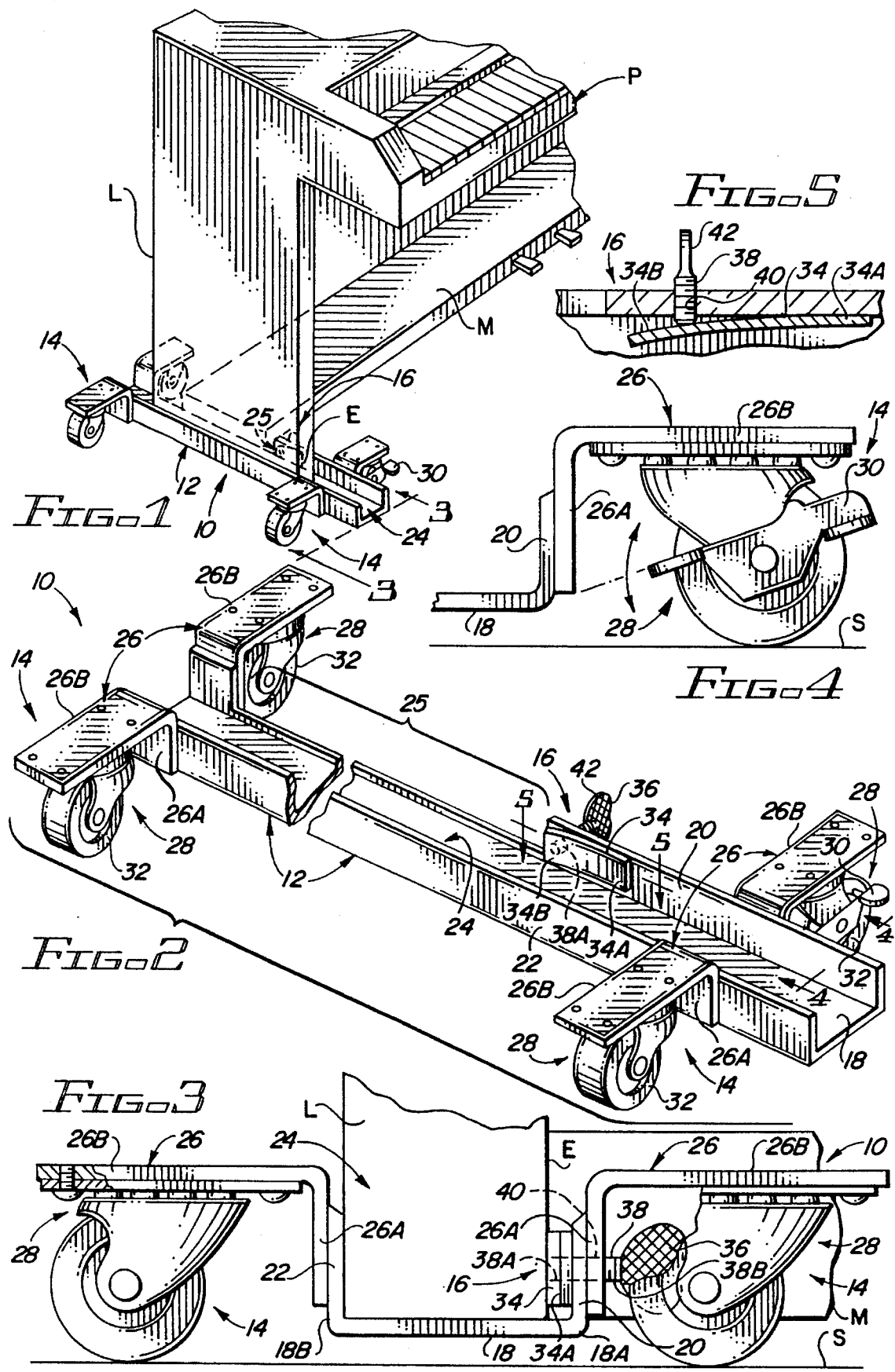

DOLLY HAVING ELONGATED CHANNEL WITH RELEASABLE FRICTIONAL SECUREMENT DEVICE

BACKGROUND OF THE INVENTION

1. Field of the Invention

The present invention generally relates to a dolly for movably supporting an upright structure, such as vertical pianos and organs, and, more particularly, is concerned with a dolly having an elongated channel with a releasable frictional securement device.

2. Description of the Prior Art

A variety of dolly constructions have been provided in the prior art for supporting and moving upright structures, such as vertical or upright pianos, organs and the like (which, for the sake of brevity, will hereinafter be referred to as upright pianos). Some examples are the ones disclosed in U.S. Pat. No. 4,220,347 to Huntington and the U.S. patents cited therein and the ones shown in a catalog from Paul L. Jansen & Son Inc. of Oshkosh, Wis.

Many of these dollies are intended to remain permanently with the upright piano for supporting the piano at all times so that it can be moved about when desired. It is important that dollies be mechanically stable under and releasably securable to the bottom flat ends of the vertical panel-like end supports of the upright piano so that they will make it easy to move the upright piano without the risk of becoming detached inadvertently while the upright piano is being moved. A drawback of many dollies is that they do not have both a mechanically stable construction and a releasable securing means and thereby are susceptible to the above-mentioned risk.

Consequently, a need exists for improvements in dolly construction which will overcome this drawback of prior art dollies.

SUMMARY OF THE INVENTION

The present invention provides an improved dolly construction designed to satisfy the aforementioned need. The dolly of the present invention has an elongated channel with a releasable frictional securement device which releasably secures the dolly to the lower end portion of the upright piano support leg which the dolly underlies and supports so as to avoid the drawback of prior art dollies.

Accordingly, the present invention is directed to a dolly constructed to support a bottom flat end portion of one of a pair of vertical panel-like end supports of an upright piano. The dolly comprises: (a) an elongated rigid support member formed by an elongated narrow bottom wall and a pair of laterally spaced side walls rigidly connected along opposite longitudinal side edges of the bottom wall and extending upwardly therefrom, the support member defining an elongated channel extending between the laterally spaced side walls and above the bottom wall, the channel being open along its upper end for receiving therethrough the lower end portion of the support leg; (b) carriage means mounted to opposite ends of the support member for supporting the support member in a spaced relationship above a support surface and for undergoing movement across the support surface; and (c) a releasable securement device adjustably mounted to one of the side walls of the support member and extendable into the channel for forceably engaging the lower end portion of the one support leg.

The carriage means includes a pair of flanges respectively rigidly connected to and extending laterally outwardly in opposite directions from upper edges of the side walls of the support member at the opposite ends of the support member, and a plurality of caster wheel assemblies mounted to the flanges for rollably mounting the support member. Each caster wheel assembly is mounted to an underside of one of the flanges of each pair thereof at the opposite ends of the support member.

The securement device includes a semi-flexible band disposed along the interior of a portion of the one side wall of the support member and attached thereto at one end of the band, and an adjustment element mounted to the one side wall for engaging an opposite end of the band at an inner end of the adjustment element for forcing the band into frictional contact with the surface of the lower end portion of the support leg. The adjustment element is a thumb screw having a threaded stem threadably mounted through a threaded aperture in the one side wall of the support member and engagable at an inner end with the lower end portion of the support leg of the vertical piano and a finger grip head attached to an outer end of the threaded stem.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 1 is a perspective view of a dolly of the present invention shown supporting a bottom flat end of one of a pair of vertical panel-like end supports of an upright piano.

FIG. 2 is an enlarged foreshorten perspective view of the dolly of FIG. 1.

FIG. 3 is an enlarged cross-sectional view of the dolly taken along line 3—3 of FIG. 1.

FIG. 4 is an enlarged fragmentary end elevational view of the dolly as seen along line 4—4 of FIG. 2.

FIG. 5 is an enlarged sectional view of the releasable securement device of the dolly taken along line 5—5 of FIG. 2.

DETAILED DESCRIPTION OF THE INVENTION

Referring to the drawings, and particularly to FIG. 1, there is illustrated one of a pair of dollies, generally designated 10, constructed in accordance with the principles of the present invention. Each dolly 10 is constructed to support a lower or bottom flat end portion E of one of a pair of vertical panel-like end support legs L of an upright piano P.

Referring to FIGS. 1–3, the dolly 10 basically includes an elongated rigid support member 12, carriage means 14 and a releasable frictional securement device 16. The elongated support member 12 is formed by an elongated narrow bottom wall 18 and a pair of laterally spaced opposite side walls 20, 22. The opposite side walls 20, 22 are rigidly connected along a pair of opposite longitudinal side edges 18A, 18B of the bottom wall 18 and extend upwardly therefrom and generally parallel to one another. The support member 12 of the dolly 10 defines an elongated channel 24 extending between the laterally spaced side walls 20, 22 and above the bottom wall 18. The channel 24 is open at its opposite ends and along its upper end for receiving the lower end portion E of the support leg L therein. One of the side walls 20 of the support member 12 has a portion located between and spaced from opposite ends of the one side wall 20 which is cutout to define a slot 25 through which will extend a horizontal cross member M which extends between the support legs L at the respective opposite ends of the upright piano P.

The carriage means 14 of the dolly 10 is mounted to the opposite ends of the support member 12 so as to support the support member 12 in a spaced relationship above a support surface S and for undergoing movement across the support surface S. The carriage means 14 of the dolly 10 includes a pair of right-angle flanges 26 respectively connected to and extending laterally outwardly in opposite directions from upper edges of the side walls 20, 22 of the support member 12 at the opposite ends of the support member 12. Each right-angle flange 26 has a lower vertical portion 26A rigidly fixed to end portions of the side walls 20, 22 and an upper horizontal portion 26B extending outwardly from the upper edge of the respective side wall 20, 22 at the end portions of the side walls. The carriage means 14 also includes a plurality of caster wheel assemblies 28 mounted to the flanges 26 for rollably supporting the support member. Each caster wheel assembly 28 is mounted to an underside of the upper horizontal portion of one of the flanges 26 of each pair thereof at the opposite ends of the support member 12. Each caster wheel assembly 28 has a releasable locking device 30 thereon for holding the caster wheel 32 of the assembly 28 in a desired stationary position.

The releasable frictional securement device 16 of the dolly 10 is adjustably mounted to one of side walls 20 of the support member 12 adjacent to an end of the slot 25 and extendable into the channel 24 for forceably engaging the lower flat end E of the one support leg L to thereby secure the dolly 10 thereto. The releasable frictional securement device 16 includes a semi-rigid semi-flexible flat band 34 disposed along the interior of a portion of the one side wall 20 of the support member 12 and attached thereto at one end 34A of the flat band 34. The frictional securement device 16 also includes an adjustment element 36 in the form of a thumb screw 36 having a threaded stem 38 threadably mounted through a threaded aperture 40 in the one side wall 20 for engaging an opposite end 34B of the band 34 by an inner end 38A of the threaded stem 38. The thumb screw 36 also has a finger grip head 42 attached to an outer end 38B of the threaded stem 38. By gripping and rotatably turning the head 42, the stem 38 of the thumb screw 36 can be turned and screwed into the channel 24 or out of channel 24 so as to either force the flat band 34 into frictional contact with the surface of the support leg L to thereby secure the dolly 10 to the support leg L or withdraw the flat band 34 from frictional contact with the surface of the support leg L to thereby release the dolly 10 from the support leg L.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

I claim:

1. A dolly for use in supporting a lower end portion of a panel-shaped support leg of an upright piano, said dolly comprising:

(a) an elongated rigid support member formed by an elongated narrow bottom wall and a pair of laterally spaced side walls substantially coextensive with and rigidly connected along opposite longitudinal side edges of said bottom wall and extending upwardly therefrom and generally parallel to one another, said support member defining an elongated channel extending between said laterally spaced side walls and above said bottom wall, said channel being open along its upper end for receiving therethrough the lower end portion of the support leg, one of said side walls having a portion located between and spaced from opposite ends of said one side wall being cutout to define an elongated slot through which can extend a horizontal cross member which extends between the support legs at the respective opposite ends of the upright piano;

(b) carriage means mounted to opposite ends of said support member for supporting said support member in a spaced relationship above a support surface and for undergoing movement across the support surface, said carriage means including
(i) a pair of flanges respectively connected to and extending laterally outwardly in opposite directions from upper edges of said side walls of said support member at said opposite ends of said support member, and
(ii) a plurality of caster wheel assemblies mounted to undersides of said flanges for rollably mounting said support member; and (c) a releasable frictional securement device adjustably mounted to said one of said side walls of said support member adjacent to an end of said slot and extendable into said channel for forceably engaging the lower end portion of the one support leg and thereby secure the dolly thereto, said securement device including
(i) a semi-flexible flat band disposed along the interior of a portion of said one side wall of said support member and attached thereto at one end of said band, and
(ii) an adjustment element mounted to said one side wall for engaging an opposite end of said band at an inner end of said adjustment element for forcing said band into frictional contact with the surface of the lower end portion of the support leg.

2. The dolly of claim 1 wherein said channel of said support member is open at said opposite ends of said support member.

3. The dolly of claim 1 wherein each of said caster wheel assemblies has a releasable locking device thereon for holding a caster wheel of said assembly in a desired stationary position.

4. The dolly of claim 1 wherein said adjustment element is a thumb screw having a threaded stem threadably mounted through a threaded aperture in said one side wall of said support member and engagable at an inner end with the lower end portion of the support leg of the vertical piano and a finger grip head attached to an outer end of said threaded stem.

* * * * *